United States Patent Office 3,360,552
Patented Dec. 26, 1967

3,360,552
PROCESS FOR THE PREPARATION OF ETHYLENEDIAMINE BIS(o - HYDROXYPHENYLACETIC ACID) AND THE MONO-AMIDE THEREOF
Philip G. McCracken, Mobile, Ala., assignor to Geigy Chemical Corporation, Greenburgh, N.Y., a corporation of Delaware
No Drawing. Filed Nov. 27, 1963, Ser. No. 326,381
5 Claims. (Cl. 260—519)

The invention relates to an improved process for the preparation of phenolic ethylenediaminecarboxylic acid compounds. More specifically, the instant invention resides in an improvement in the process for producing a mixture of ethylenediamine bis(o-hydroxyphenylacetic acid)—hereinafter called di-acid—and ethylenediamine bis(o - hydroxyphenylacetic acid)-monoamide—hereinafter called mono-amide. The general formulae of the compounds in the mixture are respectively as follows:

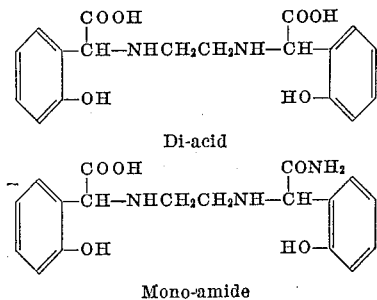

These compounds which are disclosed and claimed in U.S. Patent Nos. 3,005,848 and 3,028,407, and particularly the di-acid, are of great commercial value by virtue, e.g., of their well-established use in iron chelate form in the correction of iron chlorosis in plants growing in alkaline soils. With the use of these chelating agents increased crop yields can be obtained and submarginal agricultural areas restored to greater productivity.

The compounds of the above formulae in the form of dihydrohalides and preferably dihydrochlorides have heretofore been produced as a mixture by the following process:

Ethylenediamine bis(o - hydroxyphenylacetonitrile) is hydrolyzed under hydrolysis conditions. This hydrolysis is ordinarily effected by mixing the dinitrile with concentrated, i.e., 37%, hydrohalic, and preferably hydrochloric, acid. It has been found that under normal conditions in addition to a major portion of mono-amide a minor portion of di-acid is produced. In fact, the ratio of mono-amide to di-acid in the mixture produced is between 60-95% to between 40-5%.

This mixture of reaction products can conveniently be converted into its iron chelate or if desired into the di-acid by alkaline hydrolysis which may then be made into an iron chelate, all in accordance with well-known standard procedures.

The starting material, ethylenediamine bis(o-hydroxyphenylacetonitrile) is prepared as follows: two moles of salicylaldehyde are reacted with one mole of ethylenediamine to yield the corresponding Schiff base, disalicylideneethylenediamine, which is then reacted with two moles of hydrogen cyanide to give the corresponding dinitrile, the above starting material.

However, the high price of salicylaldehyde, the number of chemical manipulations necessary and especially low overall yield contribute to making these products expensive. Thus, the general synthesis of the desired products is an expensive method of manufacture which has proven to be one of the major deterrents to the widespread use of these compounds in combating trace metal deficiencies in agriculture. Despite their effectiveness they could be used to economic advantage only on high priced crops. Improvemment of any of the above-mentioned factors that contribute to high cost would thus be exceedingly significant.

It has now been found—and this forms the principal object of this invention—that a mixture of mono-amide and di-acid can be produced in large-scale manufacturing in yields which are significantly and consistently higher than heretofore obtainable. It has been found that yields approaching or even exceeding 90% can be achieved consistently from batch to batch by the process improvement described below while in large-scale manufacturing only average yields of up to 75% were obtainable by the prior art process outlined above. These yield data as well as those given hereinbelow are in relation to salicylaldehyde. Based on the dinitrile the yields obtained by the present process are generally quantitative, i.e., about or near 100%.

Such higher yields of reaction products can be achieved by employing hydrohalic, and preferably hydrochloric, acid of over 40%, preferably of about 41 to 43%, concentration in the hydrolysis of the dinitrile. Higher concentrations can also be utilized. It is surprising and unexpected to use hydrochloric acid of such concentrations. First of all, it is extraordinary to do so for the most concentrated hydrochloric acid commercially available or producible under ordinary conditions is the so-called "concentrated" or 37% hydrochloric acid. Secondly, it is unexpected that such higher yields would be attributable to hydrochloric acid of over 40% concentration, for a man of ordinary skill in the art would not assume from principles of acid hydrolysis that yields would be dependent on acid concentration.

While it is not fully understood why ca. 42% hydrochloric acid would be responsible for significantly increased yields, it has been established that production of certain undesirable by-products, such as, the corresponding di-amides and precursors of lactams which latter are present, for instance, in the reaction product of the alkaline hydrolysis (di-acid) is correspondingly reduced.

In the subject process, the dinitrile in a toluene slurry is cooled to about 5° C. and the ca. 42% hydrochloric acid, cooled to 0° C., is added to the dinitrile slurry within about 3 to 5 minutes with agitation, which is continued for about 5 minutes after addition. Then the batch is allowed to settle for about 10 minutes with the temperature rising to about 20° C. During this time the hydrochloric acid converts the dinitrile to a water-soluble substance and two layers form. The bottom aqueous layer is separated from the toluene and is placed in a vessel for further reaction. The reaction mixture is agitated for about 2 to 3 hours, while the temperature is kept at about 30° C. and then slowly heated to about 40° C. for about one hour. The batch is then diluted with an amount of water equivalent to that of the hydrochloric acid used and heated to about 60° C. for about one hour. Then the desired reaction product, a mixture of mono-amide and di-acid (in the form of their hydrochlorides) is filtered off.

The hydrochloric acid of 41 to 43%—or higher—concentration is, as mentioned above, not commercially available and has to be prepared under refrigeration by mixing 41 to 43 parts of anhydrous hydrochloric acid with 59 to 57 parts of water in a vessel designed and equipped for the purpose, e.g., a refrigerated absorber of the heat exchanger type. Alternatively, commercially available concentrated (37%) hydrochloric acid can be mixed—again under refrigeration—with sufficient anhydrous hydrochloric acid to bring up its strength to 41 to 43%. This can be accomplished by bubbling anhydrous hydrochloric acid into concentrated hydrochloric acid in a glass-lined agitated vessel with refrigerated cooling on the jacket of the vessel to remove the heat of absorption.

In the practice of this process, it has further been found that in lieu of direct use of ca. 42% hydrochloric acid, which constitutes the preferred embodiment of this invention because it results in the very highest yields, it is possible to employ concentrated hydrochloric acid but bubble to the cooled reaction mixture before addition of the concentrated hydrochloric acid, sufficient anhydrous hydrochloric acid to increase the concentration of the hydrochloric acid present to about 41 to 43%. This procedure also gives highly improved yields which are only slightly below those obtainable with direct use of ca. 42% hydrochloric acid.

As a further alternative, it has been found that a cooled mixture of concentrated hydrochloric acid and concentrated (96%) sulfuric acid is operative within the purview of this invention although not fully equivalent in terms of yields to the direct use of ca. 42% hydrochloric acid. However, considerably improved yields can indeed be achieved, for addition of concentrated sulfuric acid to concentrated hydrochloric acid causes immediate release of hydrochloric acid vapors. Such a mixture is thus a source of hydrochloric acid of a strength which is of the order of ca. 42% hydrochloric acid.

These alternate procedures are such modifications of the inventive concept as would be obvious to a man skilled in the art once the desirability of using a ca. 42% hydrochloric acid is established. These alternate procedures as well as still others that may occur to those skilled in the art are thus fully embraced by the inventive concept.

While the concentration of the hydrochloric acid used is exceedingly important, the amount of hydrochloric acid employed does not appear to be significant. While 175 to 200 lbs. per 0.09 to 0.11 lb. mole of dinitrile are used in the pilot runs described below the amount could vary between 100 to 300 lbs. and beyond.

As was shown above, the hydrolysis of the dinitrile can be carried out by stepwise increasing the reaction temperatures for given periods of time. As a modification to this procedure, it is alternatively possible to hold the reaction temperature at between 20 to 30° C. for about 8 to 12 hours. It is advantageous to practice this alternate procedure if a product containing a high ratio of monoamide is desired.

The subject invention, including the preparation of the starting material, may be illustrated by the following more detailed process description of a number of pilot plant runs; it is, however, not limited thereto.

*Preparation of Schiff base*

A reaction vessel (50 gal., glass-lined, jacketed) was filled with water, heated to boiling and drained. Toluene (95 lbs.), 22.4 lbs. of salicylaldehyde 98% (0.18 lb. mole) and 6.0 lbs. of ethylenediamine 92% (0.092 lb. mole) were charged thereto. The mixture was heated to reflux and the water removed. The batch was held for one hour at 113° C.

*Preparation of dinitrile*

This batch was cooled with water to ca. 40° C. and then with brine to 5 to 10° C. One lb. of glacial acetic acid was charged to the batch and 5.5 lbs. of hydrocyanic acid (0.20 lb. mole) was added to about 5 minutes. The mixture was allowed to react for 3 hours from the addition time. The temperature was kept at or below 30° C. with water cooling.

*Acid hydrolysis*

This reaction mixture containing the dinitrile was cooled to about 5° C. with brine. Hydrochloric acid (42%—175 lbs.), cooled to 0° C., was added to the mixture in 5 minutes with agitation. Full brine was maintained. Agitation was continued for another 5 minutes and the batch was then allowed to settle for 10 minutes. The temperature rose to ca. 20° C. during this period. Two layers formed. The lower aqueous layer was blown by air pressure to the hydrolysis vessel (30 gallons, glass-lined, jacketed). The mixture was then agitated for 2-3 hours with water cooling. The temperature was normally 30° C. during this period. The mixture was then slowly heated to 40° C. and held for one hour. Then the batch was diluted with 5 to 8 gallons of water from the previous batch, and the dilute mixture was heated to 60° C. and held for one hour. The reaction product was then filtered on a ceramic filter with a polyethylene filter cloth. After sucking down (for 1 to 2 hours), the wet cake was washed with 5 gallons of water.

Table I summarizes the results of the various runs made in accordance with the above procedure.

In other runs, a mixture of 37% hydrochloric acid and 96% sulfuric acid was used. Table II summarizes the results.

In two laboratory experiments where mixtures of 125 g. and 275 g. of 96% sulfuric acid with 810 g. and 900 g. of 37% hydrochloric acid were used, respectively, yields of 83.1% and 84.7% were respectively obtained.

In another laboratory experiment where about 40 g. of anhydrous hydrochloric acid was bubbled to the reaction mixture before adding 900 g. of 37% hydrochloric acid, the yield of desired reaction product was 86.4%.

TABLE I.—PILOT PLANT RUNS—MONO-AMIDE/DI-ACID WET CAKE

| Run No. | Lb. Moles Schiff Base | Lb. Moles HCN | Max. Reaction Temp., °C. | Wt. HCl, Lbs. | Conc., Wt. Percent | Separation Temp., °C. | Time Conc., HCl | Max. Temp. | Wt. Wet Cake | Assay, Percent (M.W. 433) | Yield, Percent of Theory |
|---|---|---|---|---|---|---|---|---|---|---|---|
| 1 | 0.09 | 0.202 | 27 | 175 | 42 | 17 | 10 | 27 | 75.3 | 45.7 | 88.1 |
| 2 | 0.09 | 0.199 | 26 | 180 | 42 | 23 | 10 | 27 | 91.0 | 37.7 | 87.9 |
| 3 | 0.09 | 0.202 | 16 | 175 | 42 | 21 | 10 | 31 | 85.5 | 38.8 | 85.0 |
| 4 | 0.09 | 0.199 |    | 175 | 43 | 14 | 4 | 40 | 72.5 | 47.4 | 88.0 |
| 5 | 0.09 | 0.202 | 25 | 175 | 42 |    | 60 | 25 | 66.5 | 53.1 | 90.3 |
| 6 | 0.09 | 0.202 | 25 | 180 | 42 | 12 | 4 | 48 | 92.5 | 37.0 | 87.9 |
| 7 | 0.09 | 0.202 |    | 175 | 42 | 22 | 3 | 40 | 103.5 | 35.6 | 94.6 |
| 8 | 0.09 | 0.202 | 32 | 180 | 43 | 29 | 60 | 29 | 94.0 | 36.4 | 87.7 |
| 9 | 0.09 | 0.199 | 27 | 176 | 42 | 22 | 4.5 | 85 | 88.5 | 38.8 | 88.1 |
| 10 | 0.11 | 0.243 | 34 | 200 | 42 | 28 | 4 | 25 | 147.5 | 27.5 | 85.4 |

TABLE II.—PILOT PLANT RUNS—MONO-AMIDE/DI-ACID WET CAKE

| Run No. | Lb. Moles Schiff Base | Lb. Moles HCN | Max. Reaction Temp., °C. | Wt. 37% HCl, | Wt. 96% H₂SO₄, lbs. | Separation Temp., °C. | Time Conc., HCl | Max. Temp. | Wt. Wet Cake | Assay, Percent (M.W. 433) | Yield, Percent of Theory |
|---|---|---|---|---|---|---|---|---|---|---|---|
| 1 | 0.11 | 0.245 | 27 | 160 | 50 | 25 | 5.5 | 22 | 104 | 36.9 | 81.1 |
| 2 | 0.11 | 0.243 | 25 | 161 | 50 | 15 | 12 | 25 | 131 | 31.3 | 86.5 |

What is claimed is:

1. In a process of hydrolyzing ethylenediamine bis(o-hydroxyphenylacetonitrile) to a mixture of ethylenediamine bis(o-hydroxyphenylacetic acid) and ethylenediamine bis(o-hydroxyphenylacetic acid)-monoamide in the presence of hydrohalic acid, the improvement which consists in using hydrochloric acid of a concentration of over 40%.

2. A process according to claim 1 wherein said hydrochloric acid is of a concentration of 41 to 43%.

3. In a process of hydrolyzing ethylenediamine bis(o-hydroxyphenylacetonitrile) to a mixture of ethylenediamine bis(o-hydroxyphenylacetic acid) and ethylenediamine bis(o-hydroxyphenylacetic acid)-monoamide in the presence of hydrohalic acid, the improvement which consists in using concentrated hydrochloric acid admixed with sulfuric acid.

4. A process according to claim 3 wherein said sulfuric acid is concentrated sulfuric acid.

5. In a process of hydrolyzing ethylenediamine bis(o-hydroxyphenylacetonitrile) to a mixture of ethylenediamine bis(o-hydroxyphenylacetic acid) and ethylenediamine bis(o-hydroxyphenylacetic acid)-monoamide in the presence of hydrohalic acid, the improvement which consists in adding to the dinitrile anhydrous hydrochloric acid before adding thereto concentrated hydrochloric acid.

References Cited

UNITED STATES PATENTS 3,028,407   4/1962   Knell et al. _____ 260—519

OTHER REFERENCES

Treatise on Inorganic Chemistry, H. Remy, vol. I, p. 791.

LORRAINE A. WEINBERGER, *Primary Examiner.*

D. D. HOROWITZ, RICHARD K. JACKSON,
*Examiners.*

L. A. THAXTON, *Assistant Examiner.*